US009811473B2

(12) United States Patent
Lu

(10) Patent No.: US 9,811,473 B2
(45) Date of Patent: Nov. 7, 2017

(54) STORAGE UNIT CONTROLLER AND CONTROL METHOD THEREOF, AND STORAGE DEVICE

(71) Applicant: Nuvoton Technology Corporation, Hsinchu (TW)

(72) Inventor: Chia-Ching Lu, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 580 days.

(21) Appl. No.: 14/476,758

(22) Filed: Sep. 4, 2014

(65) Prior Publication Data

US 2015/0301944 A1 Oct. 22, 2015

(30) Foreign Application Priority Data

Apr. 22, 2014 (TW) ............................ 103114512 A

(51) Int. Cl.

*G06F 12/10* (2016.01)
*G06F 12/02* (2006.01)
*G06F 12/1027* (2016.01)

(52) U.S. Cl.

CPC ...... *G06F 12/1027* (2013.01); *G06F 12/0246* (2013.01); *G06F 2212/1032* (2013.01); *G06F 2212/608* (2013.01)

(58) Field of Classification Search

CPC ......................... G06F 12/1027; G06F 12/0246
USPC .................................................. 711/156, 143
See application file for complete search history.

(56) References Cited

U.S. PATENT DOCUMENTS 6,798,599 B2 9/2004 Dykes et al.
6,941,423 B2 9/2005 Coulson
7,809,886 B2 10/2010 Ashmore et al.
8,040,727 B1 10/2011 Harari
8,081,504 B2 12/2011 Chen et al.
8,113,437 B2 2/2012 Kang
8,115,188 B2 2/2012 Gosain et al.
(Continued)

FOREIGN PATENT DOCUMENTS

CN 101478031 7/2009
CN 102169719 8/2011
(Continued)

OTHER PUBLICATIONS

"Office Action of Taiwan Counterpart Application", dated Oct. 22, 2015, p. 1-p. 23, in which the listed reference as cited.

*Primary Examiner* — Pierre-Michel Bataille
(74) *Attorney, Agent, or Firm* — JCIPRNET

(57) ABSTRACT

A storage unit controller and a control method thereof, and a storage device are provided. The storage unit controller includes an address mapping unit, a nonvolatile buffer and an update indicator. The update indicator sets an indicated flag according to whether a first data saved in the nonvolatile buffer is written to a storage unit. The address mapping unit checks the indicated flag when power is on. When the checked indicated flag indicates that writing the first data is not completed, the address mapping unit enables an update operation mode so as to perform background operations: the first data has not yet been successfully addressed to the storage unit previously, but saved in a simulated address of the nonvolatile buffer to transfer the first data from the simulated address to an actual address of the storage unit.

19 Claims, 4 Drawing Sheets

Begin
Power is on
S301
Check the indicated flag to see whether it is set as "update is completed" ?
S302
No
Yes
Normal operation mode
S303
Write/erase the data at the specific address ?
S304
No
Yes
Clear the indicated flag and set it as "writing data is not completed"
S305
Enable the update operation mode
S306
Check the status register to see whether it is not busy ?
S307
No
Yes
Set the indicated flag as "update is completed"
S308

(56) References Cited

U.S. PATENT DOCUMENTS

| | | | |
|---|---|---|---|
| 8,477,055 | B2 | 7/2013 | Choi et al. |
| 8,589,764 | B2 | 11/2013 | Takeuchi et al. |
| 8,635,511 | B2 | 1/2014 | Takeuchi et al. |
| 9,274,937 | B2 * | 3/2016 | Batwara ................ G06F 3/0608 |
| 2012/0042200 | A1 | 2/2012 | Takeuchi et al. |
| 2012/0303870 | A1 | 11/2012 | Park et al. |
| 2013/0027079 | A1 | 1/2013 | Nazarian et al. |
| 2013/0027081 | A1 | 1/2013 | Nazarian et al. |
| 2015/0091475 | A1 * | 4/2015 | Lieu .......................... H02J 9/06 318/3 |
| 2015/0178202 | A1 * | 6/2015 | Sankaran ............ G06F 12/0811 711/122 |

FOREIGN PATENT DOCUMENTS

| | | |
|---|---|---|
| CN | 102412827 | 4/2012 |
| KR | 101031420 | 4/2011 |
| KR | 20110057839 | 6/2011 |
| TW | 201225100 | 6/2012 |
| TW | 201321976 | 6/2013 |
| TW | 201342051 | 10/2013 |
| TW | 201403318 | 1/2014 |
| TW | 201411343 | 3/2014 |

* cited by examiner

STORAGE UNIT CONTROLLER AND CONTROL METHOD THEREOF, AND STORAGE DEVICE

CROSS-REFERENCE TO RELATED APPLICATION

This application claims the priority benefit of Taiwan application serial no. 103114512, filed on Apr. 22, 2014. The entirety of the above-mentioned patent application is hereby incorporated by reference herein and made a part of this specification.

BACKGROUND OF THE INVENTION

Field of the Invention

The embodiments of this invention are related to a storage unit controller and a control method thereof.

Description of Related Art

FIG. 1 is a block diagram illustrating a conventional storage device. Please refer to FIG. 1. A storage device 100 includes a nonvolatile memory 10 and a controller 20. When a host transmits data to the storage device 100 for storage, if the power of the storage device 100 is unstable or turned off during the writing process, data errors or data loss will occur.

For example, the storage device 100 may be a flash drive. During the process of data writing, when the user inappropriately removes the flash drive from the host, normally the incompletely updated data will be lost.

In addition, a general nonvolatile memory is either an NAND flash memory or an exclusive NOR flash memory which does not write at a fast speed. When the storage device 100 writes the data into the nonvolatile memory 10, it normally takes the user a long time to wait, which consequently causes inconvenience to the user.

SUMMARY OF THE INVENTION

An embodiment of present invention provides a storage unit controller. The storage unit controller includes an address mapping unit, a nonvolatile buffer and an update indicator. The nonvolatile buffer is coupled to the address mapping unit. The update indicator is coupled to the address mapping unit and the nonvolatile buffer. The update indicator sets an indicated flag according to whether a first data saved in the nonvolatile buffer is written to a storage unit. The address mapping unit checks the indicated flag when a power is on. When the checked indicated flag indicates that writing the first data is not completed, the address mapping unit enables an update operation mode.

Based on another perspective, another embodiment of the invention provides a memory control method, which includes setting the indicated flag according to whether the first data saved in the nonvolatile buffer is written into the storage unit; checking the indicated flag when the power is on; and enabling the update operation mode when the checked indicated flag indicates that the first data is not completed.

Based on another perspective, another embodiment of the invention provides a storage device, which includes a storage unit and a nonvolatile buffer. The nonvolatile buffer is coupled to a storage unit. When the host is to write the first data to the storage unit, the first data is written to a simulated address of the nonvolatile buffer, and then the first data is written to a first actual address of the storage unit from the simulated address.

It should be noted that the above general descriptions and the following embodiments are provided as examples for explanations only and therefore should not be construed as a limitation to the invention.

In order to make the aforementioned features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the disclosure. Here, the drawings illustrate embodiments of the disclosure and, together with the description, serve to explain the principles of the disclosure.

DESCRIPTION OF EMBODIMENTS

Figure 1:
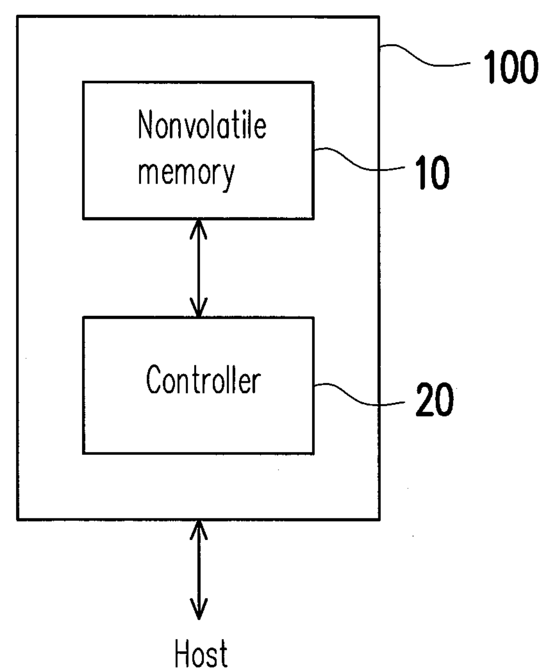
FIG. 1 is a block diagram illustrating a conventional storage device.

Descriptions of the disclosure are given with reference to the exemplary embodiments illustrated with accompanied drawings. Moreover, elements/components with same reference or similar numerals represent same or similar parts in the drawings and embodiments.

Figure 2:
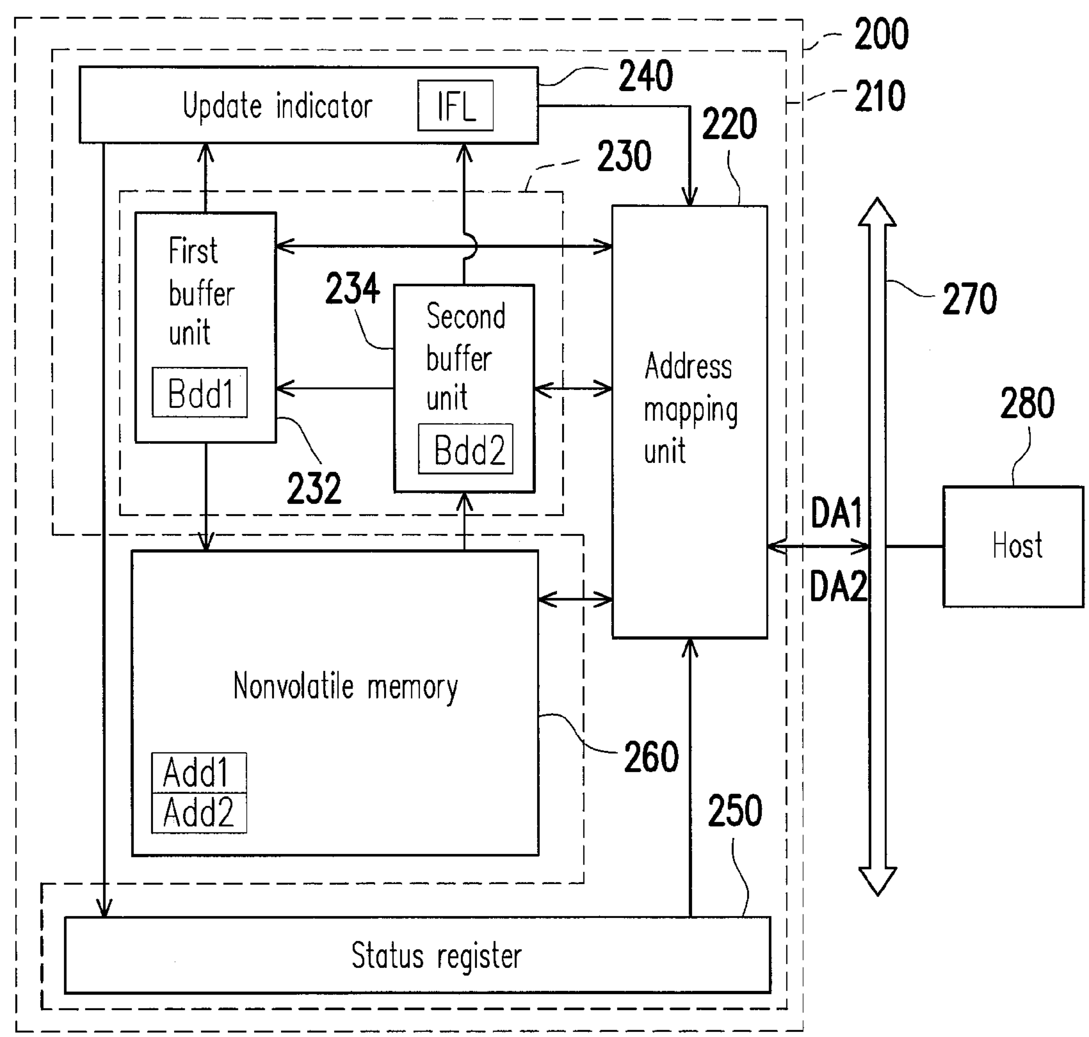
FIG. 2 is a block diagram illustrating a storage device according to an embodiment of the invention.

FIG. 2 is a block diagram illustrating a storage device according to an embodiment of the invention. Please refer to FIG. 2; a storage device 200 includes a storage unit (e.g. a nonvolatile memory 260) and a storage unit controller (e.g. a memory controller 210). In FIG. 2 and some embodiments of the invention, although the nonvolatile memory 260 and the memory controller 210 are provided as examples for description, they should not be construed as a limitation to the invention. In other embodiments, the storage device 200 may be a hard disk and other types of storage devices. In FIG. 2, the nonvolatile memory 260 (storage unit) may be replaced with, for example, a storage sector in the hard disk.

The memory controller 210 includes an address mapping unit 220, a nonvolatile buffer 230 and an update indicator 240. The update indicator 240 may be coupled to the address mapping unit 220 and the nonvolatile buffer 230. The nonvolatile buffer 230 may be coupled to the address mapping unit 220 and the nonvolatile memory 260. In the write operation, the nonvolatile buffer 230 may be used as a write buffer; in the read operation, the nonvolatile buffer 230 may be used as a read buffer.

The update indicator 240 may set an indicated flag IFL according to whether first data DA1 saved in the nonvolatile buffer 230 is written to the nonvolatile memory 260.

The address mapping unit 220 may be addressed using a mechanism of a simulated address and an actual address. The address mapping unit 220 may check the indicated flag IFL. When the indicated flag IFL indicates that writing the first data DA1 is completed, the normal operation mode may be enabled for performing subsequent write operation or read operation. When the indicated flag IFL indicates that writing the first data DA1 is not completed, it may be because the data is not completely updated during the writing operation. In other embodiments, the occurrence of power-off during the previous writing process may result in an incomplete operation of writing the first data DA1. At that point, an update operation mode may be enabled to update the incomplete previous operation of writing the first data DA1.

Under the normal operation mode, if the host 280 notifies via a bus 270 that the address mapping unit 220 of the storage device 200 is to write the first data DA1 to an actual address Add1 of the nonvolatile memory 260, the address mapping unit 220 may address the first data DA1 as follows: providing a simulated address Bdd1 corresponding to the actual address Add1, wherein the actual address Add1 may have the same address value as the simulated address Bdd1, and the simulated address Bdd1 and the actual address Add1 refer to memory locations disposed in the nonvolatile buffer 230 and the nonvolatile memory 260 respectively; recording the simulated address Bdd1 and then the update operation mode may be enabled for performing an update operation; saving the first data DA1 at the simulated address Bdd1 of the nonvolatile buffer 230; transferring the first data DA1 from the simulated address Bdd1 of the nonvolatile buffer 230 to the actual address Add1 of the nonvolatile memory 260. After executing the abovementioned addressing and update operation, the address mapping unit 220 adopts a normal address mapping for the first data DA1. More specifically, the abovementioned normal address mapping is, for example, if a host 280 is to read the first data DA1, the first data DA1 may be read from the actual address Add1 of the nonvolatile memory 260 or via another read buffer.

A speed of data written to the nonvolatile buffer 230 may be far faster than a speed of the data written to the nonvolatile memory 260. For instance, the nonvolatile buffer 230 may be a resistive random access memory (RRAM), a magnetoresistance random access memory (MRAM), a ferroelectric random access memory (FRAM), a phase change random access memory (PRAM), a conductive bridge random access memory (CBRAM), or other memories that may implement the embodiments of the invention. The nonvolatile memory may be an NAND flash memory, an exclusive NOR flash memory, or a solid state disk. In other embodiments, the nonvolatile memory may also be the abovementioned RRAM, MRAM, FRAM, PRAM, CBRAM, or other memories that may implement the embodiments of the invention. In that case, before the first data DA1 is saved in the actual address Add1, the nonvolatile buffer 230 may save the first data DA1 at a high speed.

In the writing process of the saving the data in the actual address Add1, when the power supply for the storage device 200 is removed, even if the first data DA1 is not completely written to the actual address Add1, the first data DA1 is saved at the simulated address Bdd1 of the nonvolatile buffer 230 so that the data may not be lost. On the other hand, the first data DA1 may be a general term for a plurality of data. When a plurality of data is to be written to the storage device 200, since the plurality of data may be saved in the nonvolatile buffer 230 and transferred, if the speed of the data written to the nonvolatile buffer 230 is far faster than the speed of the data written to the nonvolatile memory 260, the user may not suffer from the inconvenience of spending a long time waiting for the memory to be updated.

In addition, under the update operation mode, a simulated address mapping may be adopted for the first data DA1.

When the checked indicated flag IFL indicates that writing the first data DA1 is not completed, the address mapping unit 220 may enable the update operation mode so as to execute the background operation: in an embodiment, the first data DA1 may not be completely written to the nonvolatile memory 260 due to sudden removal of the power supply for the storage device 200; nevertheless, the first data DA1 has been saved at the simulated address Bdd1 of the nonvolatile buffer 230. Therefore, after the power supply is recovered, the background operation may be executed so as to transfer the first data DA1 from the simulated address Bdd1 of the nonvolatile buffer 230 to the actual address Add1 of the nonvolatile memory 260. When the update operation is completed, the update indicator 240 may clear the incomplete status indicated by the indicated flag IFL.

In one embodiment, the process of reading data via the simulated address mapping is described. For example, when the checked indicated flag IFL indicates that writing the first data DA1 is not completed while the host 280 is to read the first data DA1 of the storage device 200 via the bus 270, the address mapping unit 220 may transmit the first data DA1 at the simulated address Bdd1 via the nonvolatile buffer 230 to the host 280.

Furthermore, after the read operation is performed, the address mapping unit 220 may transfer the first data DA1 from the nonvolatile buffer 230 to the actual address Add 1 of the nonvolatile memory 260. When the update operation is completed, the update indicator 240 clears the incomplete status indicated by the indicated flag IFL.

In one embodiment, the nonvolatile buffer 230 may include a first buffer unit 232 and a second buffer unit 234. The first buffer unit 232 may be coupled to the address mapping unit 220 and the update indicator 240. The second buffer unit 234 may be coupled to the address mapping unit 220, the update indicator 240 and the first buffer unit 232. The first buffer unit 232 may function as a write buffer. During the process in which the address mapping unit 220 addresses and updates the first data DA1, the first data DA1 is initially saved at the simulated address Bdd1 of the first buffer unit 232, and then the first data DA1 is transferred from the simulated address Bdd1 to the actual address Add1 of the nonvolatile memory 260. The second buffer unit 234 may function as a write backup buffer of the first buffer unit 232 or a read buffer of the nonvolatile memory 260.

In another embodiment, if the host 280 is to read the data at other addresses under the update operation mode, the second buffer unit 234 may function as the read buffer of the nonvolatile memory 260. Table 1 explains the corresponding functions of the first buffer unit 232 and the second buffer unit 234 under different modes in one of the embodiments. Please refer to Table 1, which should not be construed as a limitation to the embodiments of the invention. The first buffer unit or the second buffer unit may have different functions depending on actual requirements.

TABLE 1

| | Normal operation mode | Update operation mode |
|---|---|---|
| First buffer unit | Write buffer | Write buffer |
| Second buffer unit | Read buffer | Write backup buffer |

Under the update operation mode, the address mapping unit 220 may execute the background operation to transfer the first data DA1 at the simulated address Bdd1 from the first buffer unit 232 to the actual address Add1 of the nonvolatile memory. When the first buffer unit 232 is under the update operation mode while the host 280 is to write the second data DA2 via the memory controller 210, the address mapping unit 220 not only may execute the abovementioned background operation, but also save the second data DA2 at the simulated address Bdd2 via the second buffer unit 234, and transfer the second data DA2 to the actual address Add2 of the nonvolatile memory 260.

The memory controller 210 may also include a status register 250. The status register 250 may be coupled to the update indicator 240 and the address mapping unit 220. The status register 250 may generate busy status information based on the indicated flag IFL. The address mapping unit 220 may check the status register 250 to know whether the buffer unit is busy such as performing the update operation.

Figure 3:
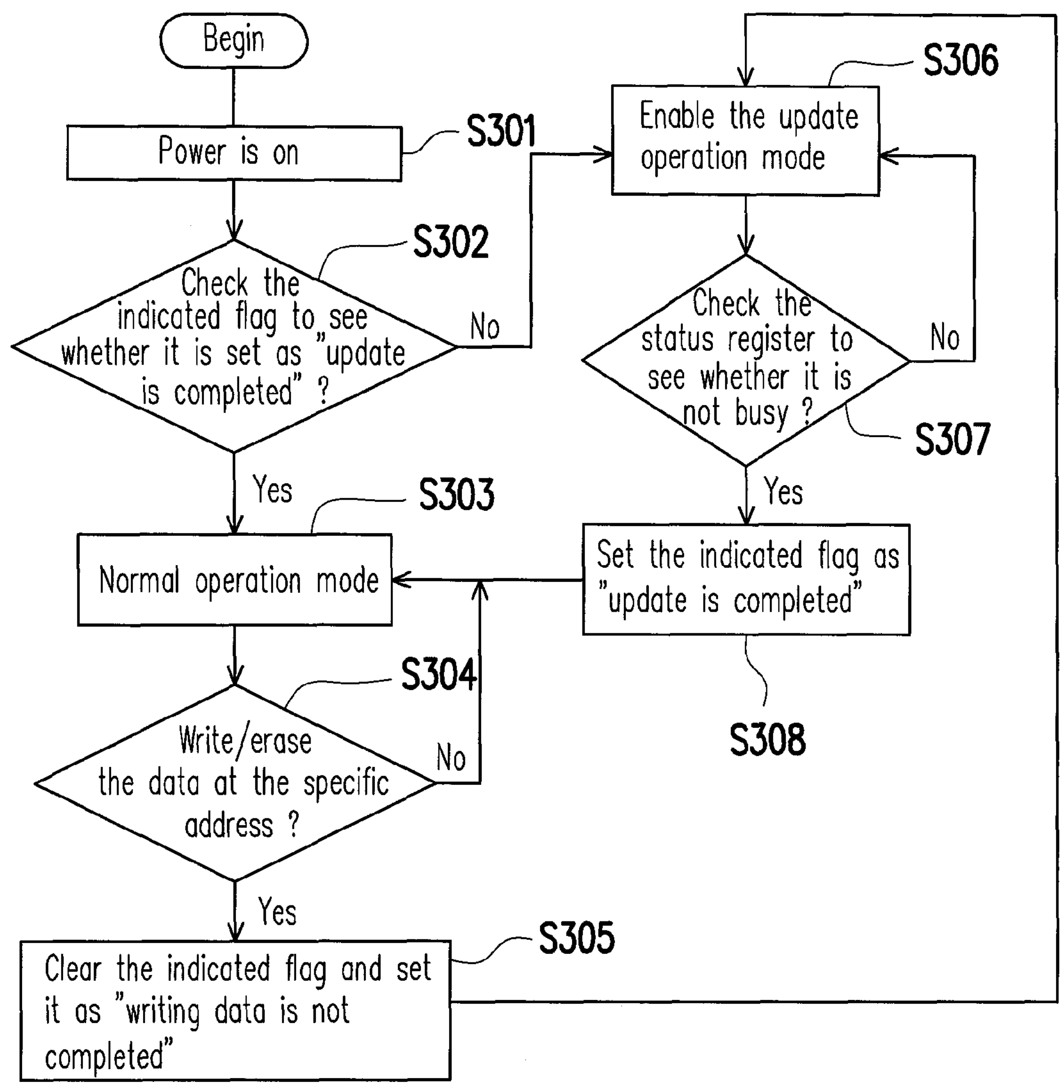
FIG. 3 is a flowchart illustrating a method for controlling a storage unit according to an embodiment of the invention.

FIG. 3 is a flowchart illustrating a method for controlling a storage unit such as a memory according to an embodiment of the invention. Please refer to both FIGS. 2-3, in step S301, the power is on may represent that the storage device 200 is connected to the power supply.

In step S302, the indicated flag IFL is checked to see whether it is set as "update is completed". If yes, in step S303, the normal operation mode is enabled and step S304 is carried out; if not, in step S306, the update operation mode is enabled to proceed with the update operation mode.

In step S304, it may be determined whether the data at a specific address is written/erased. If not, step S303 is resumed; if determined "yes" in step S304, step S305 is carried out and the indicated flag IFL is cleared to be set as "data writing is not completed". The abovementioned specific address may be an actual address Add1. Before the first data DA1 is to be written to the actual address Add1, the address mapping unit may perform addressing first; the addressing operation may include providing a simulated address Bdd1 corresponding to the actual address Add1 and recording the simulated address Bdd1. Thereafter, the update operation mode is enabled in step S306.

In step S306, the update operation mode is enabled. Thereafter, as shown in step S307, the status register 250 is checked to see whether it is not busy (for example, the update procedure is completed). If yes, in step S308, the indicated flag IFL is set as "update is completed"; in step S303, the normal operation mode is enabled. In one embodiment, the indicated flag IFL may be set as "update is completed" via the first buffer unit 232 or the second buffer unit 234. If determined "no" in step S307, step S306 is resumed to execute the update procedure again.

Figure 4:
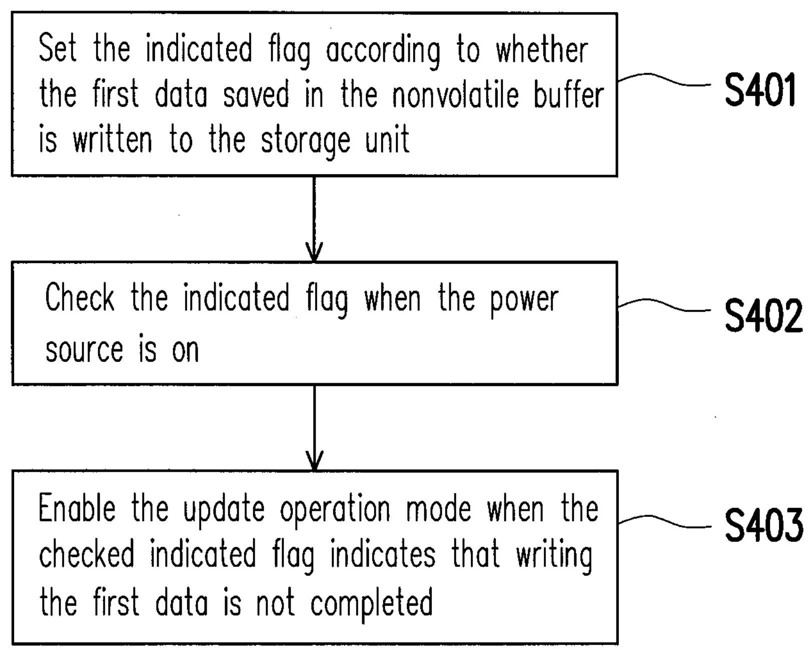
FIG. 4 is a flowchart illustrating a method for controlling a storage unit according to an embodiment of the invention.

Based on the disclosure of the above embodiments, a universal method for controlling the storage unit may be developed. More specifically, FIG. 4 is a flowchart illustrating a method for controlling a storage unit such as a memory according to an embodiment of the invention. Please see both FIGS. 2 and 4. The method for controlling the storage unit of the embodiments may include the following steps.

The indicated flag IFL is set according to whether the first data DA1 saved in the nonvolatile buffer 230 is written to the nonvolatile memory 260 (storage unit) (step S401). The indicated flag IFL is checked when power is on (step S402). When the checked indicated flag IFL indicates that writing the first data DA1 is not completed, the update operation mode is enabled so as to execute the background operation. The background operation can be that the first data DA1, which is not completely written to the nonvolatile memory 260 during the previous operation and saved at the simulated address Bdd1 of the nonvolatile buffer 230, is transferred from the simulated address Bdd1 of the nonvolatile buffer 230 to the actual address Add1 of the nonvolatile memory 260 (step S403).

In addition, when the checked indicated flag IFL indicates that writing the first data DA1 is not completed while the host 280 is to read the first data DA1, the first data DA1 may be read via the nonvolatile buffer 230. More specifically, the first data DA1 located at the simulated address Bdd1 may be transmitted to the host 280 via the first buffer unit 232. When the first buffer unit 232 is under the update operation mode while the host 280 is to write the second data DA2, the second data DA2 may be addressed to the actual address Add2 of the nonvolatile memory 260 via the second buffer unit 234. In another embodiment, when the checked indicated flag IFL indicates that writing the first data DA1 is not completed while the host 280 is to read third data (not shown) saved in the nonvolatile memory 260, the third data may be read via the second buffer unit 234.

Based on the above, in the embodiments of the invention, before the data is written to the actual address, the data may be saved in the nonvolatile buffer at a high speed, and the content may still be kept after the power supply is removed, the problem of data loss caused by the user's inappropriate operation in prior art may be effectively solved. On the other hand, the speed of the data written to the simulated address of nonvolatile buffer is faster than the speed of the data written to the actual address of the nonvolatile memory. Accordingly, when a plurality of data is written to the storage device, the user may not suffer from the inconvenience of spending a long time waiting for the memory to be updated.

It will be apparent to those skilled in the art that various modifications and variations can be made to the structure of the disclosed embodiments without departing from the scope or spirit of the invention. In view of the foregoing, it is intended that the disclosure cover modifications and variations of this specification provided they fall within the scope of the following claims and their equivalents.

Moreover, any advantages or benefits of the all the objects of the disclosure described may not apply to all embodiments or claims of the invention. Meanwhile, the abstract and title of the disclosure are provided to facilitate a searcher to locate patent literature, and it is submitted with the understanding that they will not be used to limit the scope or meaning of the claims.

What is claimed is:

1. A method for controlling a storage unit comprising a nonvolatile memory, comprising:

setting an indicated flag according to whether a first data saved in a nonvolatile buffer is written to a storage unit;

checking the indicated flag when power is on; and enabling an update operation mode when the checked indicated flag indicates that the first data is not completed, wherein enabling the update operation mode at least executes: transferring the first data saved at a simulated address of the nonvolatile buffer from the simulated address to a first actual address of the storage unit, wherein the nonvolatile buffer comprises:

a first buffer unit for saving the first data at the simulated address of the first buffer unit in a process in which the first data is addressed; and a second buffer unit coupled to the first buffer unit, wherein the second buffer acts as a read buffer of the storage unit, and used as a write backup buffer of the first buffer unit when the first buffer unit is under the update operation mode.

2. The method for controlling the storage unit according to claim 1, wherein, when the checked indicated flag indicates that writing the first data is not completed while a host is to read the first data, the first data located at the simulated address is transmitted to the host.

3. The method for controlling the storage unit according to claim 1, wherein the first data is transferred from the simulated address to the first actual address of the storage unit under the update operation mode.

4. The method for controlling the storage unit according to claim 1, wherein, when the first buffer unit is under the update operation mode while a host is to write a second data, the second data is addressed at a second actual address of the storage unit via the second buffer unit.

5. The method for controlling the storage unit according to claim 1, wherein, when the first buffer unit is under the update operation mode while a host is to read a third data saved in the storage unit via the storage unit controller, the third data is read via the second buffer unit.

6. A storage unit controller, comprising:

an address mapping unit;

a nonvolatile buffer coupled to the address mapping unit; and an update indicator coupled to the address mapping unit and the nonvolatile buffer, and the update indicator setting an indicated flag according to whether a first data saved in the nonvolatile buffer is written to a storage unit;

wherein the address mapping unit checks the indicated flag when power is on, when the checked indicated flag indicates that writing the first data is not completed, the address mapping unit enables an update operation mode, and enabling the update operation mode at least comprises: transferring the first data saved at a simulated address of the nonvolatile buffer from the simulated address to a first actual address of the storage unit, wherein the nonvolatile buffer comprises:

a first buffer unit coupled to the address mapping unit and the update indicator, wherein the first data is initially saved at the simulated address of the first buffer unit during a process in which the address mapping unit addresses the first data; and a second buffer unit coupled to the address mapping unit, the update indicator and the first buffer unit, wherein the second buffer unit acts as a read buffer of the storage unit and used as a write backup buffer of the first buffer unit when the first buffer unit is under the update operation mode.

7. The storage unit controller according to claim 6, wherein, when the checked indicated flag indicates that writing the first data is not completed while a host is to read the first data via the storage unit controller, the address mapping unit transmits the first data at the simulated address to the host.

8. The storage unit controller according to claim 6, wherein the nonvolatile buffer is a resistive random access memory (RRAM), a magnetoresistance random access memory (MRAM), a ferroelectric random access memory (FRAM), a phase change random access memory (PRAM), or a conductive bridge random access memory (CBRAM).

9. The storage unit controller according to claim 6, wherein the address mapping unit transfers the first data from the simulated address to the first actual address of the storage unit under the update operation mode.

10. The storage unit controller according to claim 6, wherein, when the first buffer unit is in the update operation process while a host writes a second data via the storage unit controller, the address mapping unit addresses the second data to a second actual address of the storage unit via the second buffer unit.

11. The storage unit controller according to claim 6, wherein, when the first buffer unit is under the update operation mode while a host is to read a third data saved in the storage unit via the storage unit controller, the third data is read via the second buffer unit.

12. The storage unit controller according to claim 6, further comprising:

a status register coupled to the update indicator and the address mapping unit, and the status register generating a busy status information under the update operation mode according to the indicated flag.

13. The storage unit controller according to claim 6, wherein a speed of the first data written to the simulated address of nonvolatile buffer is faster than a speed of the first data written to the first actual address of the storage unit.

14. A storage device, comprising:

a storage unit;

a nonvolatile buffer coupled to the storage unit;

an address mapping unit coupled to the nonvolatile buffer, the address mapping unit performs addressing before a first data is written to the nonvolatile buffer so as to provide a simulated address corresponding to the first actual address and record the simulated address; and an update indicator coupled to the nonvolatile buffer and the address mapping unit, and the update indicator sets an indicated flag according to whether the first data saved in the nonvolatile buffer is written to the storage unit, wherein the address mapping unit checks the indicated flag when power is on, when the checked indicated flag indicates that writing the first data is not completed, the address mapping unit enables an update operation mode to enter the update operation mode so as to transfer the first data saved in the nonvolatile buffer but not completely written to the storage unit from the simulated address to a first actual address of the storage unit, wherein, when a host is to write the first data to the storage unit, the first data is written to the simulated address of the nonvolatile buffer, and then the first data is written to the first actual address of the storage unit from the simulated address.

15. The storage device according to claim 14, wherein the first data not completely written to the storage unit is saved in the nonvolatile buffer when power is off, and the first data is not lost after the power is off.

16. The storage device according to claim 14, wherein the address mapping unit receives a write command from the host, and writes the first data to the simulated address, then the address mapping unit transfers the first data from the simulated address to the first actual address.

17. The storage device according to claim 14, wherein, when the checked indicated flag indicates that writing the first data is not completed while a host is to read the first data via the storage device, the storage device transmitted the first data at the simulated address to the host via the address mapping unit.

18. The storage device according to claim 14, wherein the storage unit is an NAND flash memory, an exclusive NOR flash memory, a resistive random access memory (RRAM), a magnetoresistance random access memory (MRAM), a ferroelectric random access memory (FRAM), a phase change random access memory (PRAM), a conductive bridge random access memory (CBRAM), a solid state disk or a storage sector in a hard disk.

19. The storage device according to claim 14, wherein the nonvolatile buffer comprises:

a first buffer unit coupled to the address mapping unit and the update indicator; and a second buffer unit coupled to the address mapping unit, the update indicator and the first buffer unit, wherein the second buffer unit acts as a read buffer of the storage unit, and used as a write backup buffer of the first buffer unit when the first buffer unit is under the update operation mode.

* * * * *